(12) United States Patent
Shah et al.

(10) Patent No.: US 12,373,245 B2
(45) Date of Patent: Jul. 29, 2025

(54) SYSTEMS AND METHODS FOR CONFIGURATION DRIVEN INTEGRATION OF SERVICES IN BUSINESS PROCESS MODELS AGNOSTIC OF WORKFLOW SYSTEMS

(71) Applicant: JPMORGAN CHASE BANK, N.A., New York, NY (US)

(72) Inventors: Shreyas Shah, Marlboro, NJ (US); Mukul Khajanchi, Jersey City, NJ (US); Neeraj K Singh, East Brunswick, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 732 days.

(21) Appl. No.: 17/653,599

(22) Filed: Mar. 4, 2022

(65) Prior Publication Data

US 2023/0281038 A1    Sep. 7, 2023

(51) Int. Cl.
*G06F 9/48* (2006.01)
*G06F 9/30* (2018.01)
*G06F 16/955* (2019.01)
*G06F 16/958* (2019.01)

(52) U.S. Cl.
CPC .......... *G06F 9/4881* (2013.01); *G06F 9/3012* (2013.01); *G06F 16/955* (2019.01); *G06F 16/986* (2019.01)

(58) Field of Classification Search
CPC .... G06F 9/3012; G06F 9/4881; G06F 16/955; G06F 16/986; G06F 9/465; G06F 16/2246; G06F 16/2474; G06F 9/547
See application file for complete search history.

(56) References Cited

U.S. PATENT DOCUMENTS

| | | | |
|---|---|---|---|
| 7,877,299 B2* | 1/2011 | Bui | G06Q 20/102 705/64 |
| 8,260,940 B1* | 9/2012 | Vosshall | H04L 67/01 709/228 |
| 8,701,128 B2* | 4/2014 | Salt | G06F 9/541 719/330 |
| 9,342,327 B1* | 5/2016 | Reddy | G06F 9/44521 |
| 9,940,610 B1* | 4/2018 | Davison | G06Q 20/12 |
| 10,427,786 B2* | 10/2019 | Shaw | G08G 5/006 |
| 10,708,177 B2* | 7/2020 | Bailey | H04L 67/10 |
| 11,681,696 B2* | 6/2023 | Beskrovny | G06F 9/5055 707/770 |

(Continued)

*Primary Examiner* — Douglas M Slachta
(74) *Attorney, Agent, or Firm* — GREENBERG TRAURIG LLP

(57) ABSTRACT

Systems and methods for configuration driven integration of services in business process models agnostic of a workflow system are disclosed. An exemplary method includes receiving, at a service executor, a generic service call from a business process management notation (BPMN), wherein the generic service call includes a service name parameter, wherein the service name parameter is associated with a service task of the BPMN, and wherein the service name parameter is associated with a service. The service executor can construct a call to the service including required data from a transient data store. The service executor can then receive return data from the service, store the data in the transient data store and respond to the BPMN that the service task has been completed.

20 Claims, 3 Drawing Sheets

(56) References Cited

U.S. PATENT DOCUMENTS

| | | | |
|---|---|---|---|
| 2002/0120685 A1* | 8/2002 | Srivastava | G06F 16/958 715/255 |
| 2003/0163513 A1* | 8/2003 | Schaeck | G06Q 30/02 709/201 |
| 2008/0059558 A1* | 3/2008 | Singh | G06F 16/958 707/E17.116 |
| 2011/0252114 A1* | 10/2011 | Okuyama | G06F 8/60 709/217 |
| 2011/0321010 A1* | 12/2011 | Wang | G06F 9/449 717/116 |
| 2012/0017222 A1* | 1/2012 | May | H04L 12/6418 719/328 |
| 2017/0039052 A1* | 2/2017 | Balachandran | G06F 8/71 |
| 2019/0102157 A1* | 4/2019 | Caldato | G06F 9/4881 |
| 2021/0034714 A1* | 2/2021 | Jackson | G06Q 50/184 |
| 2021/0141623 A1* | 5/2021 | Bequet | G06F 9/546 |

* cited by examiner

```
{
  "ClientByIDService": {
    "serviceName": "sampleServiceName",
    "description": "Service that performs the actions",
    "serviceAppName": "sampleServiceAppName",
    "httpMethod": "POST",
    "serviceType": "sampleServiceType",
    "serviceApiList": [
      {
        "regions": ["Region 1"],
        "endpoint": "https://region1-sample-service-query.domain.net/sampleServiceType"
      },
      {
        "regions": ["Region 2"],
        "endpoint": "https://region2-sample-service-query.domain.net/sampleServiceType"
      }
    ],
    "serviceRequestMap": {
      "requestBody": {
        "internalCustomerIdentifier": "$_dependency.primeData.caseList[0].processList[0].clientList[0].internalCustomerID"
      }
    },
    "serviceResponseMap": {
      "workItemKeyMap": {
        "ticketId": "$_Input.transientStoreDocKeyMap.ticketId",
        "processId": "$_Input.transientStoreProcessKey",
        "serviceTaskId": "$_Input.transientStoreDocKeyMap.serviceTaskId"
      },
      "responseMap" : {
        "response": "clientByID.data.getClientByID"
      }
    },
    "flattenJson": "boolean",
    "dataPersistence": "boolean",
    "transientStoreProcessKey": "String",
    "transientStoreDocKeyMap": {
      "ticketId": "String",
      "serviceTaskId": "String"
    },
    "requiredFields": [ "servicePayload", "transientStoreDocKeyMap"]
  }
}
```

Configuration Sec. 212
Configuration Sec. 214
Configuration Sec. 216
Configuration Sec. 218

SYSTEMS AND METHODS FOR CONFIGURATION DRIVEN INTEGRATION OF SERVICES IN BUSINESS PROCESS MODELS AGNOSTIC OF WORKFLOW SYSTEMS

BACKGROUND

1. Field of the Invention

The invention relates generally to systems and methods for configuration driven integration of services in business process models agnostic of a workflow system.

2. Description of the Related Art

As the need for straight-through processing of complex business processes grows, the utilization of business process models and workflow systems has grown significantly. Workflow systems are used to execute the work as modeled using the industry standard business process model notation (BPMN) which is used for modeling and describing the orchestration of work.

Manual workflows are generally comprised of human-executed tasks and do not require any service interactions. Automated workflows, however, can leverage programmatic services to execute service tasks in a BPMN. Increasingly, an opportunity to automate work using programmatic services is encountered, in particular as representational state transfer-based services (ReST) have become more widely available and reusable across an organization. ReST allows for more rapid integration and automation. One challenge with this approach, however, is that it generally requires software engineers to implement the integration for each individual service in each workflow thereby increasing the time to deployment and cost of a workflow-based solution. Where there are many services to be used, this becomes both a tedious and time-consuming task as well as a introducing maintenance challenges if and when any services change. For a service widely used across multiple workflows, it can require each workflow to be reconfigured and re-tested when any individual service has changed.

SUMMARY

In some aspects, the techniques described herein relate to a method including: receiving, at a service executor, a generic service call from a business process management notation (BPMN), wherein the generic service call includes a service name parameter, wherein the service name parameter is associated with a service task of the BPMN, and wherein the service name parameter is associated with a service; determining, based on the service name parameter, a service registry entry in a service registry associated with the service name parameter; constructing a service call based on service call details in the service registry entry; embedding, in the service call, required data specified in the service registry entry; submitting the service call to the service; receiving, in response to the service call, return data, wherein the return data is specified in the service registry entry; storing the return data in a transient data store; and returning, to the BPMN and in response to the generic service call, an indication that the service task has been completed.

In some aspects, the techniques described herein relate to a method, wherein the service is included in a services repository.

In some aspects, the techniques described herein relate to a method, wherein the service call is formatted as a uniform resource locator (URL).

In some aspects, the techniques described herein relate to a method, wherein the URL points to a ReSTfull service.

In some aspects, the techniques described herein relate to a method, wherein the required data is retrieved from the transient data store.

In some aspects, the techniques described herein relate to a method, wherein the required data is stored in a format specified in the service registry entry.

In some aspects, the techniques described herein relate to a method, wherein the return data is stored in a format specified in the service registry entry.

In some aspects, the techniques described herein relate to a method, wherein the BPMN includes a plurality of service tasks and wherein each service task is associated with a service of a plurality of services.

In some aspects, the techniques described herein relate to a method, wherein the plurality of services are included in the services repository.

In some aspects, the techniques described herein relate to a method, wherein the service registry entry is formatted as a JSON document.

In some aspects, the techniques described herein relate to a system, including one or more servers, wherein the one or more servers includes a processor and a memory, wherein the memory stores instructions that include a service executor, and wherein the service executor configures the processor to: receive a generic service call from a business process management notation (BPMN), wherein the generic service call includes a service name parameter, wherein the service name parameter is associated with a service task of the BPMN, and wherein the service name parameter is associated with a service; determine, based on the service name parameter, a service registry entry in a service registry associated with the service name parameter; construct a service call based on service call details in the service registry entry; embed, in the service call, required data specified in the service registry entry; submit the service call to the service; receive, in response to the service call, return data, wherein the return data is specified in the service registry entry; store the return data in a transient data store; and return, to the BPMN and in response to the generic service call, an indication that the service task has been completed.

In some aspects, the techniques described herein relate to a method, wherein the service is included in a services repository.

In some aspects, the techniques described herein relate to a method, wherein the service call is formatted as a uniform resource locator (URL).

In some aspects, the techniques described herein relate to a method, wherein the URL points to a ReSTfull service.

In some aspects, the techniques described herein relate to a method, wherein the required data is retrieved from the transient data store.

In some aspects, the techniques described herein relate to a method, wherein the required data is stored in a format specified in the service registry entry.

In some aspects, the techniques described herein relate to a method, wherein the return data is stored in a format specified in the service registry entry.

In some aspects, the techniques described herein relate to a method, wherein the BPMN includes a plurality of service tasks and wherein each service task is associated with a service of a plurality of services.

In some aspects, the techniques described herein relate to a method, wherein the plurality of services are included in the services repository.

In some aspects, the techniques described herein relate to a method, wherein the service registry entry is formatted as a JSON document.

BRIEF DESCRIPTION OF THE DRAWINGS

FIG. 2 is an exemplary service registry entry, in accordance with aspects.

DETAILED DESCRIPTION OF EMBODIMENTS

Figure 1:
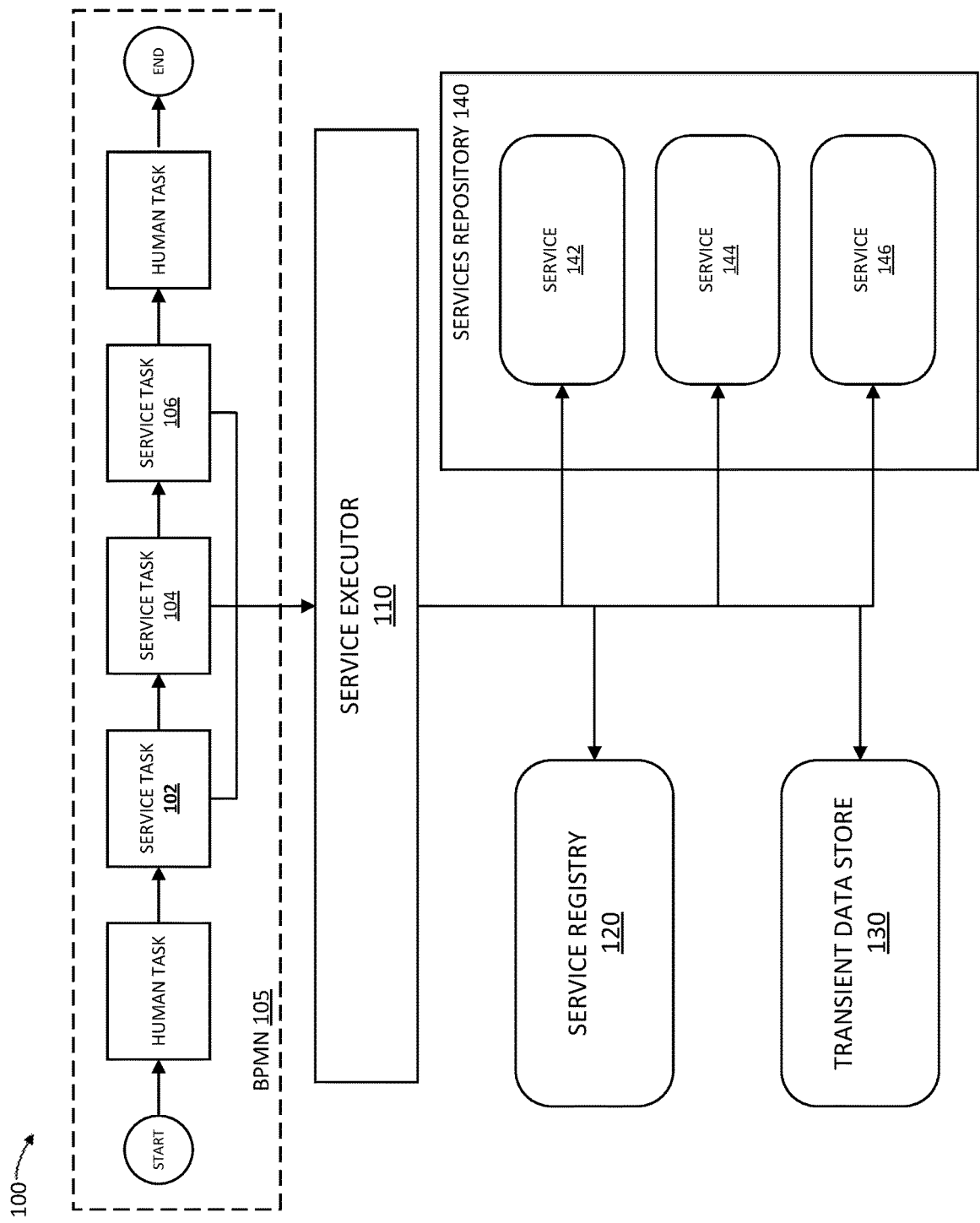
FIG. 1 is a block diagram of a system for implementing configuration driven integration of services in business process models agnostic of workflow systems, in accordance with aspects.

The invention relates generally to systems and methods for configuration driven integration of services in business process models agnostic of a workflow system.

Business Process Model Notation (BPMN) is an industry standard for describing business workflows through graphical representations. A BPMN workflow (referred to herein as a "BPMN") generally includes steps that can or must be carried out by a programmatic service (e.g., a microservice). These are referred to as service tasks of a BPMN. A service or programmatic service, as used herein, is any computer program that can carry out a BPMN service task.

Even when substantial parts of a service can be reused among service tasks of many different BPMNs, there is additional work needed in order to configure the service so that a given BMPN can connect to the service and connect to the correct data stores to carry out a given service task. This rewiring of the service, and testing thereof, must be manually performed by a developer, and reduces efficiency. Moreover, this reconfiguration and testing of services must be done every time a service is used to carry out a different BPMN service task.

Aspects disclosed herein are directed to a centralized service registry that can include configuration details and a transient data store that allows specification of interaction details describing how a service interacts with a BPMN. An inventory of services can be built, and service therein can reference the configuration details and be used with any BPMN workflow.

Interoperability of programmatic services can be further via the management of transient data across services integrated in a BPMN. The management of the transient data as a generic capability allows the BPMN to seamlessly transition from one service integration to the next without the need for each workflow to manage its own data and persistence. The transient data may be referenced across services using a consistent but configurable taxonomy during the service execution of an instance of a BPMN.

A transient data store can be utilized to generically store data for any workflow in a dynamic manner. For example, aspects may include generating/configuring a java script object notation (JSON) document for each workflow instance at the time of execution. Such a document can be stored in a document repository or cache (e.g., such as ElasticSearch). The document can be pre-populated with a standard set of details related to the workflow. The document can be read to and written to during the life of the BPMN as directed by a service executor component of the subject system. The document may be destroyed on the successful completion of the workflow.

A service registry can be leveraged to maintain the configuration details of each individual service and the interaction of data maintained in the transient data store. For example, aspects may include identification of a service required for a workflow; capturing required details in the service registry such as the service name tag, one or more uniform resource locator (URL) endpoint(s), the http method (httpMethod) for calling the service, the service name, the service request map detailing the data required as input and the service response map detailing the expected data to receive.

FIG. 1 is a block diagram of a system for implementing configuration driven integration of services in business process models agnostic of workflow systems, in accordance with aspects. System 100 includes BPMN 105. BPMN 105 includes a start, an end, and a series of task that define a business process. Some of the tasks are human executed tasks. Some of the tasks, however, are service executed tasks. BPMN 105 includes service task 102, service task 104 and service task 106. Each of these service tasks can be executed by a programmatic service. Exemplary programmatic services (or simply, "services") are computer programs developed to complete one or several service tasks, and include service types and architectures, such as microservices, ReST services, etc.

With continued reference to FIG. 1, services repository 140 stores service 142, service 144, and service 146. Service 142 corresponds to service task 102 in that service 142 is configured to programmatically complete business tasks specified in service task 102. This correspondence also exists between service 144 and service task 104, and service 146 and service task 106.

FIG. 1 further includes service registry 120. Service registry 120 stores service registry entries, which can include configurations that detail how to call each of the services from the services repository 140. These configurations can also detail what data each service requires, what data format the service expects, error procedures, response codes to expect, response data models to expect, etc. As each service is being executed, all input and output data can be stored in transient data store 130.

Transient data store 130 can store data for each service in services repository 140 in the format specified by each respective configuration of each service. For instance, if a data field of "ticketId" is defined as type "String" in a service's configuration, then all instances of a ticketID can be stored as String values in transient data store 130. Transient data store remains available for the entire life of BPMN 105, in accordance with aspects.

Service executor 110, as depicted in FIG. 1, is configured as a stand-alone single service that interfaces with BPMNs and orchestrates the execution of services when a corresponding service task of a BPMN is ready for execution, in accordance with aspects. The BPMN standard includes a mechanism for specifying a task as a service task (as opposed to, e.g., a human execute task). This mechanism can be configured with details for calling a specific service. In system 100, however, BPMN 105 can be configured to generically call service executor 110. The generic call to service executor 110 from BPMN 105 can include an indication of a service in services repository 140. For example, in a generic call to service executor 110, BPMN 105 can include a service name parameter, rather than specific details of how to execute the service that corresponds to the service name parameter. Upon receiving the generic call, service executor 110 can manage the execution of the service that corresponds to the service name parameter and make a return call to the BPMN when the service has completed.

FIG. 2 depicts an exemplary service registry entry, in accordance with aspects. Service registry entry 200 can be stored in a service registry, such as service registry 120. Service registry entry 200 is depicted in JSON format, but any necessary or desired format can be used for a service registry (e.g., XML, CVS, etc.). Service registry entry 200 can includes multiple configuration sections: configuration Section 212; configuration section 214; configuration section 216; and configuration section 218.

Configuration Section 212 is a service name section of service registry entry 200, and includes fields such as "serviceName," "description," "httpMethod," "serviceType," etc., along with corresponding values. In accordance with aspects, a BPMN can make a generic service call to a service executor and pass a service name parameter specified in a service registry entry (e.g., "ClientByID Service") to the service executor. The service executor can than use the configuration listed in the service registry entry with the name that corresponds to the received service name parameter to execute the corresponding service.

For example, and with reference back to FIG. 1, the ClientByIDService, may correspond to service 144. Accordingly, when service executor 110 receives a generic service call from BPMN 105 including the service name parameter ClientByIDService, service executor 110 can execute service 144 in accordance with the configuration specified in service registry entry 200.

Configuration section 214 of service registry entry 200 specifies regions with respective service endpoints. "Region 1" and "region 2" indicate the correct URL to call based on a regional location from where the URL will be called from. Configuration section 214 also specifies the specific endpoint of the service for each region, which is configured as a URL. Based on region, a service executor can call the appropriate endpoint.

Configuration section 216 includes details of what information the corresponding service needs in order to complete execution. A service executor can retrieve the data specified in configuration section 216 from a transient data store. The retrieved data can then be included in the endpoint URL and passed to the corresponding service. Configuration section 216 is labeled "serviceRequestMap."

Configuration section 218 includes details of what data to expect back from the corresponding service, and what the respective data type should be for the received data. Configuration section 218 is labeled as "serviceResponseMap," and includes data fields such as "ticketId" and "servicTaskID" with data types "String" and "String," respectively.

Figure 3:
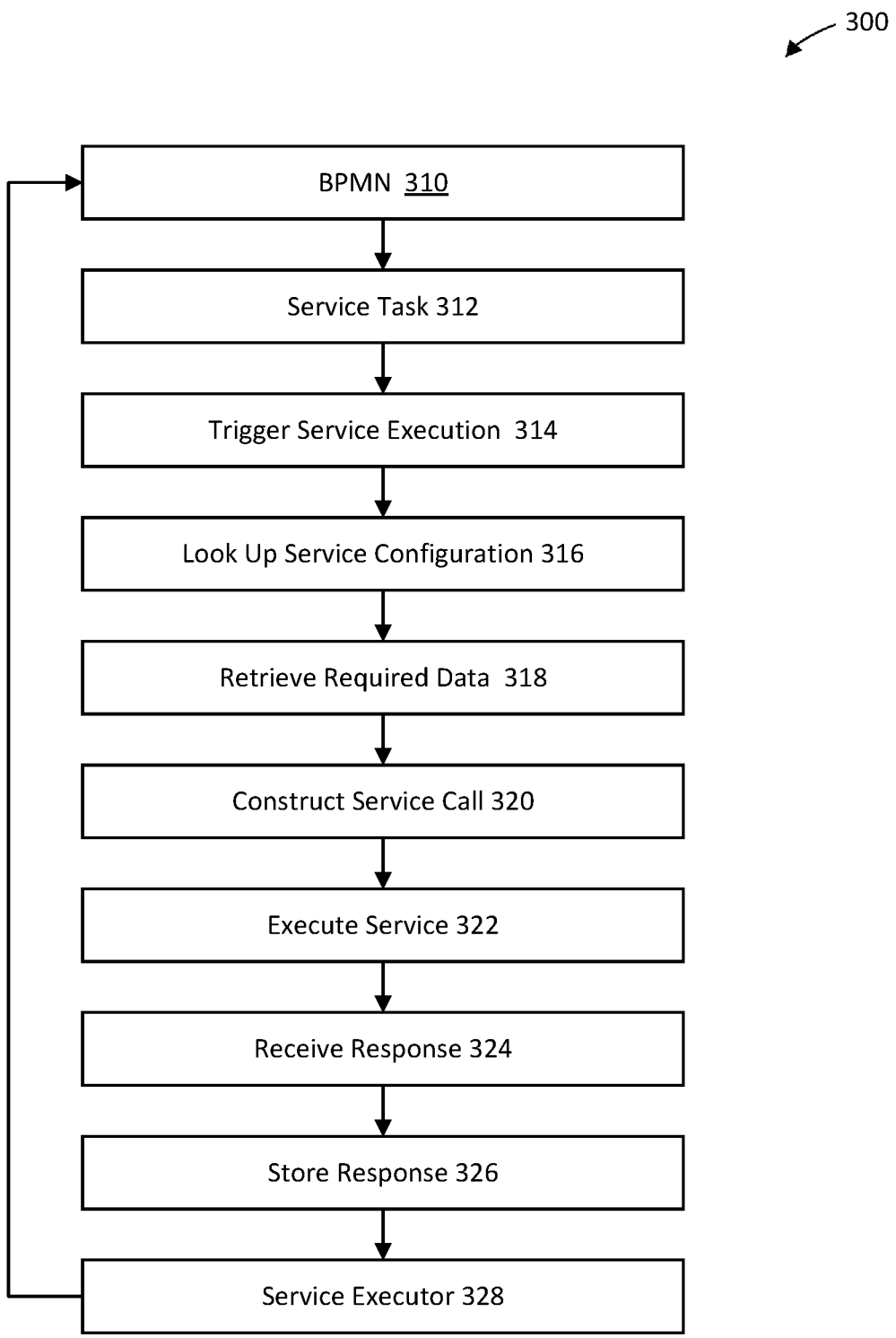
FIG. 3 is a logical flow for implementing configuration driven integration of services in business process models agnostic of workflow systems, in accordance with aspects.

FIG. 3 is a logical flow for implementing configuration driven integration of services in business process models agnostic of workflow systems, in accordance with aspects. Logical flow 300 begins at step 310. At step 310, A BPMN can be generated by a business organization and tasks included in the BPMN can be started in sequential order. At step 312, the BPMN sequence can specify a service task, and at step 314, the BPMN can trigger the service task by making a generic service call to a service executor. The generic call can include a service name as a parameter. The service name can specify a service registry for a service stored in a service repository.

With continued reference to FIG. 2, at step 316, the service executor can look up the service configuration in the service registry by reference to the received service name parameter. The service configuration can be stored in a service registry, and the service registry can be formatted as machine-readable file, such as a JSON document. Based on the service configuration, at step 318, the service executor can retrieve the data required by the referenced service from a transient data store. Once the required data is retrieved, the service executor can construct a service to the referenced service that includes the required data as parameters of the service call at step 320. In accordance with aspects, the relevant service registry can specify the form of the service call based on region. For example, the service call may be a URL pointing to a ReSTfull service, and the URL may be different for different regions listed in the service registry.

At step 322 of FIG. 3, the service executor can submit the service call and cause the referenced service to execute using the retrieved data passed to it in the service call. At step 324, the service executor can receive a response from the referenced service, including the data that is indicated for a response from the referenced service in the service registry. At step 326, the service executor can store the data received in the response in the transient data store. As described above, the transient data store for the service can be maintained during the lifecycle of the calling BPMN. At step 328, the service executor can respond to the generic service call of the BPMN, indicating that the referenced service has completed the service task. The service executor can then listen for additional generic service calls from the BPMN, which, when received can start the process over again at step 310.

The various processing steps and/or data flows depicted in the figures and described in greater detail herein may be accomplished using some or all of the system components also described herein. In some implementations, the described steps may be performed in different sequences and various steps may be omitted. Additional steps may be performed along with some or all of the steps shown in the depicted flow diagrams. Some steps may be performed simultaneously. Accordingly, the logical flows illustrated in the figures, and described in greater detail herein, are meant be exemplary and, as such, should not be viewed as limiting. These logical flows may be implemented in the form of executable instructions stored on a machine-readable storage medium and/or in the form of electronic circuitry.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications, or equivalent arrangements.

The invention claimed is:

1. A method comprising:
receiving, at a service executor, a generic service call from a business process management notation (BPMN), wherein the generic service call includes a service name parameter, wherein the service name parameter is associated with a service task of the BPMN, and wherein the service name parameter is associated with a service;
determining, based on the service name parameter, a service registry entry in a service registry associated with the service name parameter;
constructing a service call based on service call details in the service registry entry;
embedding, in the service call, required data specified in the service registry entry, the required data comprising a service name tag, a uniform resource locator ("URL") endpoint, a http method for calling the service, the service name parameter, a service request map, and the service response map;
submitting the service call to the service;
receiving, in response to the service call, return data, wherein the return data is specified in the service registry entry;
storing the return data in a transient data store; and
returning, to the BPMN and in response to the generic service call, an indication that the service task has been completed.

2. The method of claim 1, wherein the service is included in a services repository.

3. The method of claim 2, wherein the service call is formatted as a uniform resource locator (URL).

4. The method of claim 3, wherein the URL points to a ReSTfull service.

5. The method of claim 1, wherein the required data is retrieved from the transient data store.

6. The method of claim 5, wherein the required data is stored in a format specified in the service registry entry.

7. The method of claim 1, wherein the return data is stored in a format specified in the service registry entry.

8. The method of claim 2, wherein the BPMN includes a plurality of service tasks and wherein each service task is associated with a service of a plurality of services.

9. The method of claim 8, wherein the plurality of services are included in the services repository.

10. The method of claim 4, wherein the service registry entry is formatted as a JSON document.

11. A system, comprising one or more servers, wherein the one or more servers includes a processor and a memory, wherein the memory stores instructions that comprise a service executor, and wherein the service executor configures the processor to:
receive a generic service call from a business process management notation (BPMN), wherein the generic service call includes a service name parameter, wherein the service name parameter is associated with a service task of the BPMN, and wherein the service name parameter is associated with a service;
determine, based on the service name parameter, a service registry entry in a service registry associated with the service name parameter;

construct a service call based on service call details in the service registry entry;

embed, in the service call, required data specified in the service registry entry, the required data comprising a service name tag, a uniform resource locator ("URL") endpoint, a http method for calling the service, the service name parameter, a service request map, and the service response map;

submit the service call to the service;

receive, in response to the service call, return data, wherein the return data is specified in the service registry entry;

store the return data in a transient data store; and return, to the BPMN and in response to the generic service call, an indication that the service task has been completed.

12. The system of claim 11, wherein the service is included in a services repository.

13. The system of claim 12, wherein the service call is formatted as a uniform resource locator (URL).

14. The system of claim 13, wherein the URL points to a ReSTfull service.

15. The system of claim 11, wherein the required data is retrieved from the transient data store.

16. The system of claim 15, wherein the required data is stored in a format specified in the service registry entry.

17. The system of claim 11, wherein the return data is stored in a format specified in the service registry entry.

18. The system of claim 12, wherein the BPMN includes a plurality of service tasks and wherein each service task is associated with a service of a plurality of services.

19. The system of claim 18, wherein the plurality of services are included in the services repository.

20. The system of claim 14, wherein the service registry entry is formatted as a JSON document.

* * * * *